No. 867,963.
PATENTED OCT. 15, 1907.
E. FISCHER.
RESIN SOAP.
APPLICATION FILED MAY 31, 1904.
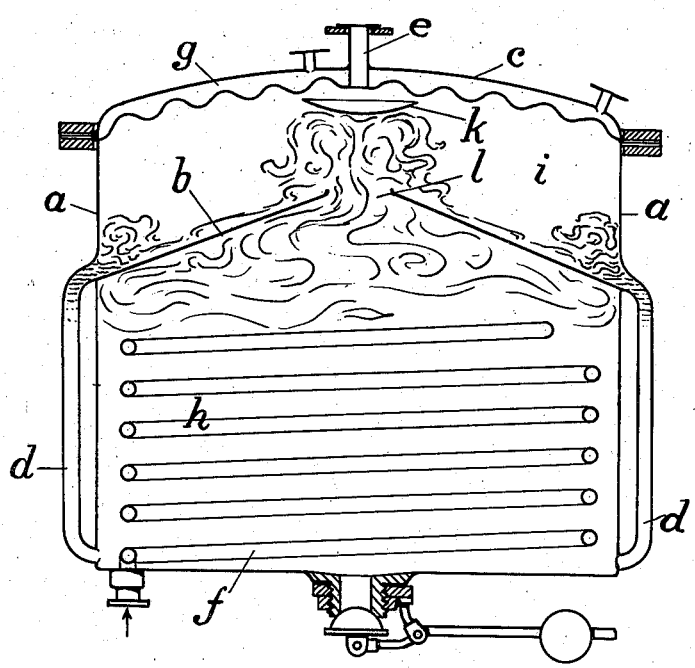
Witnesses:—
C. H. ———
Charles P. Menger
Inventor:—
Ernst Fischer
by Paul ———
his attorney.

UNITED STATES PATENT OFFICE.

ERNST FISCHER, OF DRESDEN, GERMANY, ASSIGNOR TO THE ARABOL MANUFACTURING COMPANY, OF NEW YORK, N. Y., A CORPORATION OF NEW YORK.

RESIN SOAP.

No. 867,963.   Specification of Letters Patent.   Patented Oct. 15, 1907.

Application filed May 31, 1904. Serial No. 210,532.

*To all whom it may concern:*

Be it known that I, ERNST FISCHER, a subject of the Emperor of Germany, and a resident of Dresden, Germany, have invented certain new and useful Improvements in the Manufacture of Resin Soap; and I do hereby declare the following to be a full and clear description of my invention, such as will enable others skilled in the art to which it appertains to make and use the same.

My invention has reference to improvements in the manufacture of resin size and particularly to a hard and brittle size which under blows of a hammer breaks like crude resin and which contains free resin.

For this purpose my invention consists essentially in mixing the required quantities of resin and soda (sodium carbonate) with the minimum amount of water; boiling this mixture within a suitable vessel and keeping substantially constant the said amount of water by condensing the vapors of the same within said vessel and directly returning it; permitting the carbonic acid evolved to simultaneously escape; and finally after the complete escape of the carbonic acid removing the water.

In carrying out my invention I employ a suitable apparatus such as the apparatus shown in the accompanying drawing, which represents a sectional elevation.

The receptacle $a$, preferably of cylindrical shape, is divided by means of the false bottom $b$ into chambers $h$ and $i$, of which the lower one $h$ is provided with a suitable heating arrangement, for instance, a pipe coil $f$. The upper chamber $i$ is provided with a cover $c$, which in turn is provided with suitable cooling means, for instance a water jacket $g$. Both chamber $h$ and $i$ are intercommunicating below by pipes or wells $d$. In the cover $c$ of the receptacle $a$ is provided an escape opening $e$ for the carbonic acid generated during the boiling process. To prevent the vapors from being carried along by the carbonic acid I preferably provide a deflector $k$ underneath this escape opening $e$. To enhance the cooling action of the jacketed cover, I may provide the inner wall with corrugations, as shown, or with air or water cooled ribs or channels.

My process is as follows: The mixture of resin, soda and as small a percentage of water as possible is filled into the lower chamber $h$ and boiled. The amount of soda utilized depends upon the amount of free resin desired in the finished product. I prefer to obtain at least 30% of free resin and for this purpose use for 100 lbs. of resin, 11 lbs. of soda ash containing 58% of soda. The carbonic acid generated during the boiling period escapes, as shown by foaming of the mixture. The rising froth passes through the central opening $l$ in the inverted cup-shaped false bottom $b$ and collects in the lowest part of the chamber $i$, from where it is drained off through the pipes $d$ back again into the lower chamber. The freed carbonic acid escapes through the opening $e$. The water vapors rising during the boiling process are condensed on the cooled cover $c$ and fall back as water into the mixture, with the result that the mixture during the boiling period has a sufficient and substantially constant percentage of water to bring about a homogeneous combination. After the boiling period has been terminated and the mixture is properly combined which is shown by cessation of the foaming, the vapors still generating are then allowed to escape, as by lifting off the cover. A hard and brittle resin size is thus obtained, containing over 30% of free resin and which under the blows of a hammer will break like crude resin. Owing to this latter property it may be broken into small pieces and therefore can be more readily and quickly dissolved, as the small pieces into which it is broken offer a relatively larger surface for the dissolving action of the water. Also, in the shipping of the size a saving in freight charges is effected in that the water content of the liquid sizes is absent. The packing and general handling of the same is also more convenient and cheaper, and the size keeps better than the ordinary soft resin size, from which water is likely to separate when it freezes.

What I claim is:—

1. As a new article of manufacture; a hard and brittle resin size containing an appreciable excess of free resin; and no appreciable amount of uncombined soda.

2. As a new article of manufacture, a hard and brittle resin size containing over 30% of free resin.

In testimony, that I claim the foregoing as my invention, I have signed my name in presence of two subscribing witnesses.

ERNST FISCHER.

Witnesses:
  FR. H. TELMERC,
  PAUL ARRAS.